United States Patent [19]

Tokoh et al.

[11] Patent Number: 5,221,566

[45] Date of Patent: Jun. 22, 1993

[54] MULTILAYERED CONTAINER AND PACKAGE UTILIZING THE SAME

[75] Inventors: Makio Tokoh; Akimasa Aoyama; Toshiaki Sato; Taichi Negi; Hidemasa Oda; Satoshi Hirofuji, all of Kurashiki, Japan

[73] Assignee: Kuraray Co., Ltd., Kurashiki, Japan

[21] Appl. No.: 853,795

[22] Filed: Mar. 19, 1992

[30] Foreign Application Priority Data

Mar. 29, 1991 [JP] Japan .................. 03-093468

[51] Int. Cl.$^5$ .................. B32B 5/16; B29D 7/24
[52] U.S. Cl. .................. 428/34.5; 428/35.7; 428/331; 428/516; 428/518; 428/704; 206/204
[58] Field of Search ............. 428/518, 35.7, 34.5, 428/704, 331, 516

[56] References Cited

U.S. PATENT DOCUMENTS

| | | | |
|---|---|---|---|
| 3,976,618 | 8/1976 | Takida | 260/40 |
| 4,284,674 | 8/1981 | Sheptak | 428/516 |
| 4,407,897 | 10/1983 | Farrell | 428/516 |
| 4,576,988 | 3/1986 | Tanaka | 524/503 |
| 4,960,639 | 10/1990 | Oda | 428/34.5 |
| 4,999,229 | 3/1991 | Moritani et al. | 428/36.6 |

FOREIGN PATENT DOCUMENTS

| | | |
|---|---|---|
| 0331072 | 9/1989 | European Pat. Off. . |
| 0401666 | 12/1990 | European Pat. Off. . |
| 47-38634 | 9/1972 | Japan . |
| 52-141785 | 11/1977 | Japan . |
| 53-88067 | 8/1978 | Japan . |
| 58-36412 | 3/1983 | Japan . |
| 61-4752 | 1/1986 | Japan . |
| 61-242841 | 10/1986 | Japan . |
| 62-6508 | 2/1987 | Japan . |
| 1591424 | 6/1981 | United Kingdom . |

OTHER PUBLICATIONS

Derwent #92-044-200 Kuraray Co. Ltd Dec. 12, 1991.

Primary Examiner—P. C. Sluby
Attorney, Agent, or Firm—Kramer, Brufsky & Cifelli

[57] ABSTRACT

A multilayered container comprising an intermediate layer of a resin composition (A) which comprises 50–95% by weight of a specific EVOH, and 50–5% by weight of an inorganic filler, and inner and outer layers of a moisture resistant thermoplastic resin (B), at least the body wall part of the container comprising multiplicity of regions in which substantially 2-dimensional thin layers of the inorganic filler extend parallel with the wall surface and laminated with each other, said layer of said resin composition (A) having a specific moisture permeability.

The multilayered container can readily be prepared by thermoforming from the corresponding multilayered structure.

Food packages obtained by filling the multilayered container of the present invention with food, sealing it and then sterilizing the package under a condition where heat and moisture act at the same time as in retorting are resistant against impermeation of oxygen that would deteriorate the food contained therein, thus exhibiting excellent storage capability, and have good container appearance.

6 Claims, No Drawings

MULTILAYERED CONTAINER AND PACKAGE UTILIZING THE SAME

BACKGROUND OF THE INVENTION

1. Field of the Invention

The present invention relates to multilayered containers comprising an intermediate layer of ethylene-vinyl alcohol copolymer (hereinafter referred to as EVOH) and inner and outer layers of moisture resistant thermoplastic resin, and packages having excellent storage capability, thermoformability and container appearance, prepared by filling the container with contents, hermetically sealing it, and then sterilizing the package in hot water or with steam.

2. Description of the Prior Art

Food packages have traditionally consisted of metal cans, glass bottles and various plastic containers, among which plastic containers have become more widely used in recent years for packaging a variety of foods because of their light weight, flexible shapes, high impact resistance and cost competitiveness.

While metal cans and glass bottles have complete impermeability against oxygen, plastic containers permit oxygen to intrude through the wall in an impermissible amount under specific conditions such as retort sterilization, where both heat and moisture act at the same time, the retorting being limelighted as a tool for revolutionarily new distribution systems. Oxygen having intruded into retorted packages deteriorates the contained foods and worsens their flavor and freshness, thus shortening the shelf life of the package.

For the purpose of overcoming those problems, plastic containers utilizing a multilayered structure having an oxygen barrier layer of EVOH laminated with a thermoplastic resin layer via an adhesive layer have become commercially available. These containers still have the following drawbacks and are hence not satisfactory as food packaging containers.

In these multilayered containers, although the EVOH layer shows very good gas barrier properties under relatively low humidity, it rapidly loses the good gas barrier properties when exposed to high temperature and high humidity conditions. Retorting, typically, creates such conditions and causes the container to be attacked by both heat and moisture at the same time.

Japanese Patent Application Laid-open No. 170,748/1982 (U.S. Pat. No. 4,407,897) and Japanese Patent Publication No. 6508/1987 disclose a multilayered structure comprising a protective layer incorporating a drying agent which reduces the influence of moisture upon retorting and thus improves the above drawback. However, since the moisture having intruded into the protective layer upon retort sterilization contacts the gas barrier layer, the once adsorbed moisture can migrate to the gas barrier layer, thereby causing the barrier properties to decrease. Further when the protective layer incorporating a drying agent is, as is often the case, exposed at the edge of the structure, the layer containing the drying agent tends to dissolve out from the edge, whereby the commercial value becomes lowered.

Japanese Patent Application Laid-open No. 242841/1986 discloses a multilayered container comprising a gas barrier layer of EVOH incorporating an inorganic powder such as talc and a layer of a thermoplastic resin provided on at least one surface of the gas barrier layer. With this system, however, a package having excellent storage capability after retorting cannot always be obtained with ease.

EVOH incorporating talc is also known. For example Japanese Patent Publication No. 21,822/1976 (U.S. Pat. No. 3,976,618) and Japanese Patent Application Laid-open No. 143,980/1987 describe a composition of EVOH incorporating talc. However, the references never disclose a technical thought as disclosed in the present invention, that comprises obtaining a container for packaging foods from a multilayered structure comprising a gas barrier layer of the very composition, and, filling it with food and sealing it and treating the package under a condition where heat and moisture act at the same time, to obtain a food package.

Japanese Patent Application Laid-open No. 253,442/1989 (U.S. Pat. No. 4,999,229) describes incorporation of 5-60% of a filler such as talc into a composition comprising EVOH and polyamide. The literature however does not describe the method for satisfying condition (I), which is an important element of the present invention as later described herein, for example further incorporating a small amount of phosphate radical.

Japanese Patent Application Laid-open No. 308,627/1989 (U.S. Pat. No. 4,960,639) and Japanese Patent Application Laid-open No. 178,344/1990 describe incorporating an EVOH of an inorganic powder such as talc or mica in an amount of 5-50% by weight based on the weight of EVOH, preferably 5-30% by weight on the same basis and a phosphoric acid compound such as sodium dihydrogenphosphate or the like in an amount of at least 3% by weight, preferably 5-30% by weight. These references however do not describe about any method for satisfying the condition (I), for example incorporating a small amount of phosphate radical. Furthermore, the above references all do not describe about the necessity that, in the EVOH composition layer of the body wall of a multilayered container, there be multiplicity of regions in which an inorganic filler such as talc incorporated therein constitutes a plurality of substantially 2-dimensional thin layers extending parallel with the container wall surface and laminated with each other and that the inorganic filler in such regions has a weight average flake diameter of not more than 50 $\mu$m and a weight average aspect ratio of flake of at least 3.

EVOH is usually used in the form of multilayered structures comprising the EVOH layer, a thermoplastic resin layer and an adhesive layer. When multilayered structures (films, sheets, parisons and the like) produced by various processes are subjected to secondary processing including heat stretching into containers, especially when heat stretched below the melting point of EVOH, the EVOH layer generate many small cracks and local nonuniform thickness areas caused by poor thermoformability, whereby the oxygen barrier properties of the shaped containers are greatly reduced. Further, the containers thus formed cannot be used for packaging foods because of their poor appearance. In particular, multilayered containers prepared by stretching at a temperature below the melting point of EVOH exhibit, after being retorted, a very poor appearance, part of the surface showing orange-skin like pattern, so that these containers cannot be used for packaging foods.

For the purpose of preventing cracks, small voids and the like of the EVOH layer formed when multilayered structures comprising it are heat stretched below the melting point of EVOH, there have been proposed a method which comprises adding various plasticizers to EVOH (Japanese Patent Application Laid-open No. 88067/1978) and a method which comprises blending polyamide resin with EVOH (Japanese Patent Application Laid-open Nos. 141785/1977 and 36412/1983). In the former method, however, in order to sufficiently improve the heat stretchability plasticizers should be added in a large amount of 10 to 20 parts by weight based on 100 parts by weight of EVOH, which decreases the gas barrier properties to a large extent and also decreases adhesiveness between the EVOH layer and other plastic resin layers, so that the method cannot be put into practical use. The latter method cannot be used in practice either, because the obtained containers contain many gels and are discolored presumably due to high reactivity of polyamide with EVOH.

Japanese Patent Application Laid-open No. 5752/1986 describes that an EVOH composition prepared by mixing in the state of solution different ethylene-vinyl acetate copolymers, and then saponifying the mixture yields, by heat stretching, containers having good appearance. The obtained containers however have a disadvantage that their gas barrier properties decrease to a large extent when used under a condition of high temperature and high humidity, such as by retort sterilization as described above.

SUMMARY OF THE INVENTION

Accordingly, it is an object of the present invention to provide a multilayered container without the aforementioned disadvantages and made from a multilayered structure comprising an intermediate layer of EVOH and inner and outer layers of moisture resistant thermoplastic resin.

Another object of the present invention is to provide a package, particularly a food package with improved characteristics in thermoformability, storage capability, and container appearance, prepared by filling the above container with contents, hermetically sealing it and then sterilizing the package under a condition where both heat and moisture act at the same time.

As a result of an intensive study, the inventors have found that the following food package has good appearance and can keep the contents without deterioration for a long time. The package is prepared by placing a food in a container made up of a multilayered structure comprising an intermediate layer of a composition which comprises an EVOH and an inorganic filler dispersed therein in a specific manner and satisfies the condition (I) and inner and outer layers of moisture resistant thermoplastic resin, sealing it and then sterilizing the package under a condition where both heat and moisture act at the same time.

It has further been found that the above multilayered structure, wherein the composition satisfies the conditions (II) and (III) as described later herein and prepared by saponifying a composition comprising at least two different types of ethylene-vinyl ester copolymers having a different ethylene content possesses, surprisingly, still more improved thermoformability and gives a sealed container possessing still more improved appearance.

Thus, the present invention provides a multilayered container comprising an intermediate layer of a resin composition (A) which comprises 50–95% by weight of an EVOH having an ethylene content of 20–60 mole percent and a degree of saponification of at least 95 mole percent, and 50–5% by weight of an inorganic filler, and inner and outer layers of a moisture resistant thermoplastic resin (B), at least the body wall part of said container comprising multiplicity of regions in which substantially 2-dimensional thin layers of the inorganic filler extend parallel with the wall surface and laminated with each other, said inorganic filler present in said regions having a weight average flake diameter of not more than 50 μm and a weight average aspect ratio of flake of at least 3; said layer of said resin composition (A) having a moisture permeability satisfying the following condition (I):

$$W \leq \sum_{i=0}^{5} (A_i \cdot E^i) \quad (I)$$

wherein W is a moisture permeability (g·30 μm/m²·day) at 40° C., 90% relative humidity, E is the ethylene content (mole percent) in the resin composition (A), $A_i$ (i=0 to 5) is a constant as shown below and $E^i$ means the i-th power of E $A_0 = 1.105 \times 10^3$ $A_1 = -8.150 \times 10$ $A_2 = 2.420 \times 10$ $A_3 = -3.535 \times 10^{-2}$ $A_4 = 2.530 \times 10^{-4}$ $A_5 = -7.091 \times 10^{-7}$.

Another embodiment of the present invention is the above multilayered container, wherein said EVOH is an EVOH composition (C) which comprises at least two different types of EVOH's each having a different average ethylene content within the range of 20 to 60 mole percent and an average degree of saponification of at least 95 mole percent, shows at least two endothermic peaks by DSC analysis, and satisfies the following conditions (II) and (III)

$$5 \leq T2 - T1 \quad (II)$$

wherein $130 \leq T1 < T2 \leq 205$ $$0.01 \leq W1/(W1+W2) \leq 0.6 \quad (III)$$

wherein T2 and T1 represent, in DSC analysis (temperature elevation rate: 10° C./min) of said composition, an independent endothermic peak maximum temperature (°C.) of melting and an independent endothermic peak minimum temperature (°C.) of melting, respectively, and W1 and W2 represent the weight of an EVOH having the maximum ethylene content and that of EVOH having the minimum ethylene content, respectively.

Still another embodiment of the present invention is the above multilayered container, wherein said EVOH is an EVOH composition (D) obtained by saponification of a composition which comprises at least two different types of ethylene-vinyl ester copolymers each having a different ethylene content.

DETAILED DESCRIPTION OF THE PREFERRED EMBODIMENTS

The present invention is now described in detail. The EVOH's used in the present invention are saponified products of ethylene-vinyl ester copolymers. As described above, it is important that the EVOH's have an ethylene content of 20-60 mole percent, preferably 25-55 mole percent. If the ethylene content is less than 20 mole percent, the resulting product will be of poor water and moisture resistance and of reduced gas barrier properties under higher humidity, and have low stress-cracking resistance and insufficient melt processability. If the ethylene content is more than 60 mole percent, the product will lose good gas barrier properties inherent to EVOH, even though its water and moisture resistance properties are improved. In both cases the products are improper as packaging materials. EVOH's used in the present invention must have a saponification degree at least 95 mole percent, preferably at least 98 mole percent. If the saponification degree is less than 95 mole percent, the resulting product will have poor heat stability, thereby forming gels during melt processing, and have poor gas barrier properties and oil resistance so that the product cannot maintain desirable properties inherent to EVOH. While vinyl acetate is mentioned as a representative example of the vinyl ester, other vinyl esters such as those of lower or higher fatty acids (vinyl propionate, vinyl valerate, etc.) can also be used. These vinyl esters may be used singly or as a mixture of two or more.

In the present invention an EVOH containing silicon and having an ethylene content of 20-60 mole percent, and a saponification degree of at least 95 mole percent, and containing vinyl silane in an amount of 0.0001-0.5 mole percent may be more effectively used for the purpose of the invention. Olefinically unsaturated monomers containing silicon can be used for this purpose, which are disclosed for example in Japanese Patent Application Laid-open No. 144304/1985 (U.S. Pat. No. 4,576,988). Examples of the olefinically unsaturated monomers containing silicon include vinyl trimethoxysilane, vinyltriethoxysilane, vinylmethyldimethoxysilane, vinyltriacetoxysilane and vinyltripropioxysilane. The silicon content is suitably selected depending on the intended use of the finished product and is generally in the range of 0.0001-0.5 mole percent, preferably 0.001-0.1 mole percent.

There are no particular limitations to the melt index (measured according to ASTM D1238 65T, at 190° C., 2160 g, hereinafter referred to as "MI") of the EVOH used in the invention, but it is preferred that the melt index be in the range of 0.1-50 g/10 min. The EVOH in the invention may have been modified with a small amount of copolymerizable monomer within a limit not to impair the purpose of the invention. Examples of the modifying monomer include, among others, propylene, 1-butene, 1-hexene, 4-methyl-1-pentene, acrylic acid esters, methacrylic acid esters, maleic acid, fumaric acid, itaconic acid, alkyl vinyl ethers, N-vinylpyrrolidone, N-normal-butoxymethylacrylamide, N-(2-dimethylaminoethyl)methacrylamide or its quarternary compounds, and N-vinylimidazol or its quartanary compounds.

The inorganic fillers used in the present invention preferably have a weight average flake diameter of not more than 50 μm, a weight average flake aspect ratio of at least 3, and a whiteness measured with Kett spectrophotometer of at least 80. With the weight average flake diameter exceeding 50 μm, blendability and processability become worse, and with this ratio being less than 3, an inferior modifying effect results. The whiteness of at least 80 is desirable in view of the color of the finished shaped articles. With respect to the weight average flake diameter and the weight average aspect ratio of the inorganic filler, it has been confirmed by scanning electron microscopy that there is essentially no difference between the values obtained for the filler before and after blending, i.e. between raw material inorganic filler and that dispersed in the finished container.

Consequently, the values of weight average flake diameter and weight average aspect ratio of an inorganic filler in the present invention mean either those measured on the filler before blending into EVOH resin or those of the filler present in the container. Inorganic fillers usable in the present invention have a weight average flake diameter of preferably not more than 30 μm, more preferably not more than 20 μm. There is no particular limitation to the lower limit of the weight average flake diameter of the inorganic filler used in the invention, but the lower limit is preferably 1 μm, more preferably 3 μm. The weight average aspect ratio is preferably at least 5, more preferably at least 10. There is no particular limitation to the upper limit of the weight average aspect ratio.

The weight average flake diameter of an inorganic filler as referred to in the present invention is determined by the following procedure.

Classify the specimen powder (i.e. inorganic filler) with microsieves or sieves having various openings, and plot the obtained data on Rosin-Rammlar chart. From the chart, read the opening $L_{50}$ of the microsieves or sieves having passed 50% of the total weight. Then the weight average flake diameter, L, is defined by the following formula:

$$L = L_{50} \text{ (in the case of microsieve)} \tag{IV}$$

$$L = 2^{\frac{1}{2}} \cdot L_{50} \text{ (in the case of sieve)} \tag{V}$$

wherein coarser particles in the powder are classified through sieves, and finer particles are classified through microsieves.

The weight average aspect ratio, α, of an inorganic filler referred to in the present invention means a value calculated from the weight average flake diameter, L, and the weight average flake thickness, d, as determined by the method below, of the inorganic filler according the following equation (VI).

$$\alpha = L/d \tag{VI}$$

The weight average flake thickness, d, is calculated using the following equation (VII) from the water surface area, s, occupied by the flake and determined by a method proposed in a paper "Particle Size Measurement by a Powder Film Method" by C. E. Capes and R. C. Coleman (Ind. Eng. Chem. Fundam., Vol. 12, No. 1, p. 124-126 (1973)), $$d = W/\rho(1+\epsilon) \cdot S \tag{VII}$$

wherein W is the weight of the flake (powder measured, ρ is the specific gravity of the powder, and $(1-\epsilon)$ is the ratio of the area occupied by the powder to the total surface area of water when the powder is in a closest packing state on the water surface, and is 0.9 for powder in general.

Examples of the inorganic filler used in the present invention include talc, clay, sericite, glass flake and mica, among which talc and clay are preferably used because of excellent impact resistance and thermoformability.

The incorporation amount for said composition (A) is selected from a range of 50-95% by weight of EVOH and 50-5% by weight of inorganic filler. The inorganic filler is more preferably incorporated in an amount of 50-15% by weight, most preferably in an amount of 40-20% by weight. If the incorporation amount of said inorganic filler exceeds 50%, the fluidity during melting, the formability of the blended composition and the strength of the formed articles, as well as the film formability of the composition will decrease. If the incorporation amount of the filler incorporated is less than 5%, an improvement of the filler on the finished formed products will not sufficiently be produced; that is, there will not fully be produced an improvement of the storage capability for the containers having an intermediate appearance of multilayered containers having an intermediate layer of the composition and having been retorted under condition where heat and moisture act at the same time.

In the present invention, the composition (A) comprising 50-95% by weight of the EVOH and 50-5% by weight of the inorganic filler is used in an intermediate layer of the multilayered container. Here, it is important that at least the body wall of the container does not contain any aggregate of the inorganic filler form but has a dispersed structure comprising a multiplicity of regions in which substantially 2-dimensional thin layers of the inorganic filler extend parallel with the wall surface and laminated with each other. This condition of the body wall can be confirmed by observation in a scanning electron microscope. The regions in which the thin layers of the inorganic filler laminate with each other and parallel with the wall surface must be present in the body part of the container, more preferably in the body and in the bottom part of the container. The term "comprising a multiplicity of regions" herein means that such regions are present not at a single place but at least in 2 places in the thickness direction of the wall.

Next described is the preparation processes for the composition (A). How to conduct kneading the resin composition (A) is important for making the inorganic filler be present in the EVOH layer in uniformly dispersed condition with no aggregation and in the form of essentially 2-dimensional thin layers laminated with each other and parallel to the wall surface of the container. First of all, mention is made of processes which comprise melt-kneading EVOH with an inorganic filler (in particular, talc) at a temperature of at least the melting point of EVOH (melt-kneading processes).

One of the processes comprises mixing EVOH powder or pellets with the inorganic filler through a conventional mixer, such as Henschel Mixer or super mixer.

A second process comprises first preparing a master batch by mixing an EVOH melt with an inorganic filler, then blending the master batch with the powder, pellets or melts of EVOH, and thereafter kneading the blend at a temperature higher than the melting point of EVOH to give the desired composition.

EVOH and an inorganic filler may directly be fed, without the preliminary mixing as described above, to a kneader where they are kneaded together. The most suited kneaders for obtaining a composition having higher uniform dispersion state without any aggregate of inorganic filler are continuous kneaders, such as continuous intensive mixer and a kneading-type twin screw extruder (same direction or different direction). Batch type kneaders such as a banbury mixer, an intensive mixer and compression kneader may also be used.

Among these kneaders, the most preferred kneader for the purpose of the present invention is a continuous intensive mixer. Commercially available models are FCM manufactured by Farrel Co., CIM manufactured by the Japan Steel Works, KCM, NCM, LCM and ACM manufactured by Kobe Steel Works and the like. From a practical viewpoint, it is preferred to place a single screw extruder under the kneader used, thereby carrying out kneading and extrusion pelletization simultaneously.

Twin screw kneading extruders having a kneading disk or kneading rotor, such as TEX manufactured by the Japan Steel Works, ZSK by Werner & Pfleiderer Incorp., TEM by Toshiba Machine Co., Ltd. and PCM by Ikegai Corp., can be used for the purpose of kneading in the present invention.

In the operation of the above continuous type kneaders, the shape of rotor or disk plays an important role. In particular, the clearance between the mixing chamber and the rotor tip or disk tip is an important factor, and the tip clearance is suitably in the range of 1-5 mm. The specific energy of a kneader particularly suited for obtaining a composition of the present invention with an excellent dispersion is at least 0.05 kWh/kg, preferably 0.1-0.8 kW/kg.

The specific energy is calculated by dividing the energy (power consumption; kW) used for kneading by the throughput of kneaded material per hour (kg/hr), and expressed in kWh/kg. Kneading at a higher specific energy than that used for ordinary kneading is necessary for obtaining the composition of the present invention. A specific energy of at least 0.05 kWh/kg cannot be realized by simply raising the number of revolutions of the kneader used. It is preferred to also raise the viscosity of the composition during kneading through a cooling device such as a jacket. The kneading temperature, i.e. a temperature of resin at the delivery of kneader, is selected from the range from the melting point of the EVOH to the melting point plus 80° C., preferably from the melting point of EVOH to the melting point plus 60° C. The revolution number of the rotor of the kneader used is in the range of 50–1200 rpm, preferably 100–1200 rpm. The inner diameter of the chamber of the kneader is at least 20 mm, preferably at least 30 mm.

The same melt kneading processes can be applied for the incorporation of an inorganic filler (talc or the like) into a resin used for the layer (B).

Another method (solvent process) for preparing the composition (A) comprises dissolving an EVOH and an inorganic filler in a mixed solvent for the EVOH, such as methanol/water or n-propyl alcohol/water. With respect to the order of dissolving, there may be employed either a process which comprises adding an inorganic filler to a solution of EVOH, one which comprises, reversely, dissolving an EVOH in a solvent with an inorganic filler dispersed therein, or one comprising simultaneous addition of the two components. After the incorporation, the composition is separated from the solvent preferably by a process as disclosed in Japanese Patent 725,520 (Publication No. 38634/1972), which comprises forming the solution into strands. In this process the strands are then, if necessary, washed with water, treated with an acid solution, etc. by a conventional method, when necessary, and then dried. As a modification of the solvent process, there may be employed a process which comprises adding an inorganic filler such as talc to a solution of vinyl ester during saponification process for obtaining the EVOH.

In the preparation of the resin composition (A), other polymers and additives such as plasticizer, lubricant, antioxidant, colorant and ultraviolet absorber can be added within limits not to impair the purpose of the present invention.

Another important element of the present invention is that the moisture permeability of the layer of the resin composition (A) satisfies the afore-mentioned condition (I), preferably the following condition (I'), more preferably the following condition (I''). The multilayered containers using the EVOH composition prepared according to the above procedure exhibit the desired improvement effect, but in some cases the improvement effect is not satisfactory. As a result of an intensive study, the inventors have found that, employment of the layer of the resin composition (A) having a specific low moisture permeability assures almost no decrease in gas barrier properties even under such conditions of higher temperatures and humidities as in retort sterilization.

$$W \leq \sum_{i=0}^{5} (B_i \cdot E^i) \quad (\text{I}')$$

$$W \leq \sum_{i=0}^{5} (C_i \cdot E^i) \quad (\text{I}'')$$

wherein W is a moisture permeability (g·30 μm/m²·day), at 40° C., 90% relative humidity, E is the ethylene content (mole percent) of the EVOH in the resin composition (A), $B_i$ (i=0—5) and $C_i$ (i=0-5) are constants as shown below and $E^i$ means the i-th power of E. The moisture permeability is measured according to JIS Z0208 on the composition (A) layer pealed out from the multilayered container.

$B_0 = 9.100 \times 10^2$ $B_1 = -6.712 \times 10$ $B_2 = 1.993$ $B_3 = -2.991 \times 10^{-2}$ $B_4 = 2.083 \times 10^{-4}$ $B_5 = -5.840 \times 10^{-7}$ $C_0 = 6.000 \times 10^{-2}$ $C_1 = -4.193 \times 10$ $C_2 = 1.188$ $C_3 = -1.667 \times 10^{-2}$ $C_4 = 1.156 \times 10^{-4}$ $C_5 = -3.163 \times 10^{-7}$ For providing such moisture permeability, a process particularly suited for the purpose of the present invention comprises incorporating 5–500 ppm of a phosphate radical ($PO_4^{-3}$) into EVOH. Examples of the compound having phosphate radical are phosphoric acid, sodium phosphate, sodium dihydrogenphosphate and disodium hydrogenphosphate. The phosphate radical is preferably incorporated in an amount of at least 10 ppm, more preferably 20 ppm and not more than 400 ppm, more preferably not more than 300 ppm.

Still another element of the present invention is that the intermediate layer of the composition (A) is provided thereon with both inner and outer layers of moisture resistant thermoplastic resin (B). Provision of only one layer of (B) on one side of the intermediate layer cannot give packages having excellent storage capability which is the purpose of the present invention.

Examples of the resin constituting the layer of moisture resistant thermoplastic resin (B) are hydrophobic resins, in particular polyolefin resins. Examples of the polyolefin resins include high density, medium density or low density polyethylene; copolymers of ethylene with an α-olefin such as vinyl acetate, acrylic acid ester, butene, hexene or 4-methyl-1-pentene; ionomers; polypropylene; polypropylene grafted with ethylene; copolymers of propylene with an α-olefin such as ethylene, hexene or 4-methyl-1-pentene; poly-1-butene, poly-4-methyl-1-pentene, and modified polyolefins prepared by modifying the above polyolefins by maleic anhydride or the like. Among the above, polypropylenes (PP) are most suited for the purpose of the present invention.

The thermoplastic resins constituting the layer (B) of the present invention further include, polyester resins such as poly(ethylene terephthalate), poly(ethylene naphthalate), poly(butylene terephthalate), poly(ethylene terephthalate/isophthalate); polystyrene resins such as polystyrene, polystyrene-butadiene copolymers, polystyrene-isoprene copolymers; and polycarbonate resins.

The resins constituting afore-mentioned (B) layers of the inner and outer layers on the intermediate layer may be the same or different. Further, to the resins constituting (B) layers the inorganic fillers as described above (talc, etc.) can be added within limits not impair the purpose of the present invention.

Still another embodiment of the present invention utilizes, when a multilayered structure having an (A) layer as the intermediate layer and (B) layers as the inner and outer layers is heat stretched into containers or the like, in particular stretched at a temperature below the melting point of EVOH, an EVOH having a suitable thermoformability, generating no cracks and uneven stretching and having excellent retortability with good appearance maintained after retorting. In this embodiment, it is important to use an EVOH composition (C) which comprises at least two types of EVOH having different average ethylene contents within a range of 20–60 mole percent and having an average degree of saponification of at least 95 mole percent, exhibits at least two endothermic peaks by DSC measurement (temperature elevation rate: 10° C./min., measured in essentially anhydrous state), and satisfies the afore-mentioned conditions (II) and (III).

It is important that the different EVOH's contain ethylene unit in an amount of 20–60 mole percent, preferably 25–55 mole percent. If the ethylene content is less than 20 mole percent, the resulting product will be of low water and moisture resistance, gas barrier properties under high humidities and stress-cracking resistance, and have unsatisfactory melt processability. If the ethylene content is more than 60 mole percent, the product will be of poor gas barrier properties, while its water and moisture resistance properties are improved. In both cases the product will not be suited as a packaging material. The EVOH's must have an average saponification degree at least 95 mole percent, preferably at least 98 mole percent. If the saponification degree is less than 95 mole percent, the resulting product will be deteriorated in heat stability, tend to form gels during melt processing and exhibit decreased gas barrier properties and oil resistance.

In the condition (II), use of an EVOH composition (C) satisfying the following condition (II') and (III') produces still better effects.

$$10 \leq T2 - T1 \tag{II'}$$

where $135 \leq T1 < T2 \leq 190$ $$0.05 \leq W1/(W1+W2) \leq 0.55 \tag{III'}$$

To obtain the EVOH composition (C) satisfying (II) and (III), there may for example be employed a process which comprises separately preparing different EVOH's satisfying the above condition and including one having T1 (i.e. having maximum ethylene content and the other one having T2 (i.e. having minimum ethylene content) then blending them in the form of melts or solution. Or, in the preparation of composition according to the process already described, an inorganic filler may be incorporated beforehand into one or both of the EVOH's satisfying the above conditions. Incorporation of the inorganic filler may also be conducted after the desired composition (C) has been obtained. While, multilayered containers using the EVOH composition (C) obtained in this manner exhibit the expected improvement effects, they are still not always satisfactory.

As a result of an intensive study, the inventors have found that use of, as the EVOH in resin composition (A), an EVOH composition (D) prepared by saponifying a composition containing at least two ethylene-vinyl ester copolymers, satisfying the afore-mentioned conditions (II) and (III) can give multilayered containers with still better gas barrier properties, thermoformability and container appearance.

Several process are available for the preparation of a composition comprising at least two ethylene-vinyl ester copolymers each having a different ethylene content: for example one comprising blending at least two ethylene-vinyl ester copolymers having a different ethylene content in the form of melts or solution and one comprising conducting polymerization in a system comprising two polymerization vessels in series or parallel, and under different polymerization conditions. In the latter case different temperatures, pressures, catalysts, polymerization periods and the like may be used; for example higher pressures give copolymers with higher ethylene content and lower pressures give those with lower ethylene content. It may also be possible to blend an ethylene-vinyl ester copolymer and an ethylene-vinyl alcohol copolymer having a different ethylene content from the ethylene-vinyl ester copolymer in the form of melts or solution. Among the above processes, one comprising using different polymerization conditions is most suitable.

For the saponification of the ethylene-vinyl ester copolymer compositions, there may be employed a process which comprises saponifying the compositions while dissolving or dispersing them in water, alcohols or other organic solvents, in the presence of an acid or alkaline catalyst. For example, the reaction is effected with a mixed solvent of hydrate methanol-methyl acetate, while methanol-methyl acetate mixed vapor is blown into the reaction zone to remove reaction by-products.

Within limits not to impair the purpose of the present invention, the EVOH composition (D) may be modified by a small amount of the afore-mentioned copolymerizable monomers, or may incorporate additives such as plasticizers, lubricants, antioxidants, color and ultraviolet absorbers.

In the present invention, where a multilayered sheet comprising a layer of resin composition (A) and layers of moisture resistant thermoplastic resin (B) has an insufficient interlaminar bond strength, it is preferable to use an adhesive layer. Any adhesive may be used for this purpose insofar as it prevents delamination of the sheet during use. Example of the adhesive are modified olefin polymers obtained by chemically (e.g. by addition reaction, grafting, etc.) bonding an unsaturated carboxylic acid or its acid anhydride to olefin polymers, e.g. polyolefins such as polyethylene, polypropylene and polybutene, and copolymers principally containing olefin units). Concrete examples of preferred modified olefin polymers are modified polyethylene grafted with maleic anhydride, modified polypropylene grafted with maleic anhydride, modified ethyl acrylate grafted with maleic anhydride and modified ethylene-vinyl acetate copolymer grafted with maleic anhydride. These polymers may be used singly or in combination. Further the adhesive used may incorporate EVOH within a limit not to impair the effects of the present invention.

In the present invention, the multilayered structures comprising the (A) layer and the (B) layers and the containers utilizing such multilayered structures can be produced by known or conventional processes. In conextrusion, the resin compositions are melt kneaded through corresponding extruders, and then extruded into predetermined shapes through a multilayered multiple die such as T-die or circular die. In co-injection, the resin compositions are melt kneaded in corresponding extruders, and then injected into a mold, to give multilayered containers or preforms for multilayered container. Multilayered structures may also be produced by other various lamination processes such as dry lamination, sandwitched lamination, and extrusion lamination.

The multilayered structures produced by the above processes have the form of sheet, film, parisons, preform or the like and are then formed into containers of the desired shapes. The formation is carried out through a process which comprises heat stretching the multilayered structures by vacuum air-pressure forming or biaxially stretching blow forming; by a process which comprises heat stretching them (sheet, film) through a biaxially stretching machine; or by a process which comprises stretch blowing the parisons or preforms obtained by co-injection. Among the above processes for producing the multilayered structures, co-extrusion yields the best results. In co-extrusion, scraps generated during production of the multilayered container of the present invention may be used as a raw material for producing the moisture resistant thermoplastic resin (B) layer, or they may constitute a layer independent of (A) and (B) layers.

The multilayered containers of the present invention preferably have an average total thickness of the body wall of 50-2500 μm, more preferably 250-1500 μm. The ratio of the (A) layer thickness to the total wall thickness is not particularly limited, but it is generally 2-30%, preferably 5-20%.

In this invention, in the preparation of a container such as cup or bottle, or a sheet- or film-like article obtained by heat stretching such as thermoforming, the term "heating" means an operation to make the multilayered structures thermally uniform by keeping them at a temperature required for the heat stretching for a prescribed period. Heating is preferably carried out with a heater selected from a variety of heaters in consideration of operability.

Heating may be conducted before or simultaneously with stretching. While being heated to thermally uniform state, a multilayered structure is formed into a cup, bottle, film or like articles by stretching with chuck, plug, vacuum pressure, compressed air pressure or the like, where the stretching may either be uniaxial or biaxial.

The thus obtained multilayered containers of the present invention are filled with contents, in particular foods, and after if necessary deaeration or replacement of the air inside by an inert gas such as nitrogen or carbon dioxide, sealed by heatsealing or like means. The packages thus prepared are then subjected to sterilization by what is known as "boiling" at not more than 100° C. or at a temperature above 100° C., in particular by retorting at 105° to 135° C. (high temperature and high pressure sterilization), to give the packages, in particular food packages, of the present invention. Here, ordinary hot water- or steam heated conditions can be employed for boiling sterilization or retorting. For retorting, various methods such as recovery-, replace-, shower- and spray-type retorting can be used.

The multilayered containers of the present invention and having the shape of cup or tray can give food packages having particularly excellent characteristics.

Contents to be packed are in most cases foods. Foods to be packed suitably are those to be eaten as they are and those cooked or semi-cooked which are to be warmed before being eaten. Examples of sterilized foods are as follows:

Cooked curry, cooked harsh, stewed beef, borsch, meat sauce, braised pork with sweet vinegared sauce, sukiyaki, sauté and chops-suey, boiled meat & potato, Japanese hotchpotch, asparagus boiled, sweet corn, mushroom, tuna cream-boiled, soups such as consommé, potage, miso-soup, pork & vegetable soup and "Kenchin" soup, boiled rice, boiled-in-iron-pot rice with subsidiaries ("Kamameshi"), roast rice, pilaf, ricegruels, spaghetti, cooked buckwheat vermicelli, Japanese noodle, Chinese noodle, noodle, seasonings such as ones for Kamameshi and for Chinese noodles, boiled red beans, thick bean-meal soup with sugar and rice cake ("Zenzai"), boiled peas with honey and beanjam ("Anmitsu"), quenelles, hamburgers, beef stakes, roast porks, pork souté, corned beef, ham, sausage, grilled fishes, roast meat, roast fowls, roast chicken, smoked fishes, bacon, boiled fish paste, pudding, jelly, sweet jelly of beans ("Yokan") and various pet foods.

Other features of the invention will become apparent in the course of the following descriptions of exemplary embodiments which are given for illustration of the invention and are not intended to be limiting of thereof. In the Examples that follow, "parts" means "parts by weight".

EXAMPLES

Example 1

Eighty (80) parts of powder of an EVOH having an ethylene content of 31 mole percent, a saponification degree of vinyl acetate moiety of 99.5 mole percent, a melt index of 1.6 g/10 min and containing sodium dihydrogenphosphate, and 20 parts of a talc powder having a weight average flake diameter of 10 μm, a weight average aspect ratio of 15, and a whiteness of 95 were premixed in a Henschel mixer and then high-speed mixed to give a blend. The blend was then kneaded, extruded and pelletized through a two-stage twin-screw different direction continuous extruder equipped with 2 mixing chambers each having an inner diameter of 30 mm and housing a mixing rotor, and a deaeration mechanism between the two rotors, and a single screw extruder connected thereto, to give blend pellets. In this operation, the tip clearance between the mixing rotor and mixing chamber was 3 mm, the kneading temperature (at delivery) was 205°-230° C., the revolution number of the rotor was 300-450 rpm, and the specific energy of revolution was 0.1-0.3 kWh/kg.

The above EVOH itself was made essentially anhydrous and tested for the melting point, Tm (temprature elevation rate: 10° C./min.) with a differential scanning calorimeter, (DSC-30 manufactured by Mettler Corp.) The obtained results are shown in Table 1.

A 3-kind/5-layer multilayered sheet having an intermediate layer of the blend pellets obtained above was formed by extrusion through a combination of an extruder for the inner and outer layers having a branched melt channel, an extruder for the intermediate layer, an extruder for adhesive layers having a branched melt channel and a T-die. The resins used were: the blend pellets for the intermediate layer, polypropylene resin (Noblen PY220 manufactured by Mitsubishi Petrochemical Co., Ltd.) for the inner and outer layers and polypropylene modified with maleic anhydride (Admer QF 500 manufactured by Mitsui Petrochemical Industries Ltd.) for the adhesive layers.

The extrusion temperature were 180°-230° C. for the intermediate layer, 200°-240° C. for the inner and outer layers, 200°-240° C. for the adhesive layers and 240° C. for the T-die. The thickness construction of the multilayered sheet was 650/75/135/75/650 μm as expressed in the order of outer layer/adhesive layer/intermediate layer/adhesive layer/inner layer.

The thus obtained multilayered sheet was thermoformed into cup-shaped containers with a round bottom having a radius of 33 mm, a circular open top having a radius of 37 mm and a height of 37 mm using a vacuum air-pressure thermoforming machine (manufactured by Asano Laboratories). The cups thus obtained had a good appearance with no cracks or thickness unevenness caused by uneven stretching. The container had a thickness construction of, from outside, 270/30/55/30/270 μm (harmonic mean thicknesses).

The cup was filled with corned beef, then the inside air was replaced by nitrogen gas, and the cup was hermetically heatsealed with a lid made of a laminate film of aluminum foil/polypropylene, to give test sample (1). A 110-cc glass bottle was filled with corn beef, then the inside air of the bottle was replaced by nitrogen gas, and thereafter the bottle was sealed tightly with an aluminum cap, to give control sample (0). The samples were retorted at 120° C. for 30 minutes using a retorting device (RCS-40 RTGN, a bench high temperature and high pressure cooking sterilization tester made by Hisaka Works).

The retorted test sample (1) was found to have good appearance and shape. This sample was stored for 3 months at 20° C., 65% relative humidity and the control sample (0) at 5° C. in a refrigerator. After the 3 months, the two samples were opened and subjected to sensory evaluation by a panel consisting of 10 members randomly selected in age and sex. All 10 panelists recognized no difference in taste, color or smell of the food as compared with that packed in the glass bottle and stored in the refrigerator, proving excellent storage capability of the test sample (1).

The intermediate EVOH layer was taken out by removing the inner, outer and adhesive layers by dissolving out with xylene and measured for moisture permeability at 40° C., 90% relative humidity, according to JIS Z0208. The EVOH layer was heated at 95° C. for 3 hours in a 0.1N nitric acid solution with stirring and then the mixture was filtered. The filtrate was subjected to an analysis of phosphate ion by ion chromatography, to give a phosphate radical content in EVOH of 45 ppm. The obtained results are also shown in Table 1.

The talc powder taken out by calcining the EVOH layer in an electric furnace was observed for shaped (weight average flake diameter and weight average aspect ratio) in a scanning electron microscope. There was found essentially no change as compared with the shapes before blending. Several test pieces were cut from the body wall of the cup and their cross-sections were observed for the intermediate layer in a scanning electron microscope. It was found that the talc powder was not aggregated, that thin layers of talc were laminated with each other and nearly parallel to the wall surface and that there were many regions containing such thin layers. The dispersibility, or the state of dispersion, of talc (which is considered to be contributing to reduction in oxygen gas permeability) was good. The results obtained are shown in Tables 1 and 2.

Examples 2 and 3

Example 1 was repeated except that the blend ratio of talc to EVOH was changed as shown in Tables 1 and 2. The results showed that thermoformability, storage capability and talc dispersibility were all good and the container appearance after retorting exhibited no change. The results are shown in Tables 1 and 2.

Example 4

Example 1 was repeated except for using an EVOH having an ethylene content of 31 mole percent, a saponification degree of vinyl acetate component of 99.5 mole percent, a vinltrimethoxysilane content of 0.027 mole percent and a melt index of 1.6 g/10 min instead of the EVOH used in Example 1. The results showed that thermoformability, storage capability and talc dispersibility were all good and the container appearance after retorting exhibited no change. The results are shown in Tables 1 and 2.

Example 5

Example 1 was repeated except for using an talc having a weight average flake diameter and weight average aspect ratio as shown in Tables 1 and 2 and employing sterilization conditions as shown. The results showed that thermoformability, storage capability and talc dispersibility were all good and the container appearance after retorting exhibited no change. The results are shown in Tables 1 and 2.

Comparative Example 1

Example 1 was repeated except that talc was not blended and that an EVOH having an ethylene content of 31 mole percent, a saponification degree of vinyl acetate component of 99.5 mole percent and an MI of 1.6 g/10 min was used alone. Poor storage capability was obtained. The results are shown in Tables 1 and 2.

Comparative Example 2

Example 1 was repeated except for using an EVOH having an ethylene content of 31 mole percent, a saponification degree of vinyl acetate component of 90.0 mole percent and an MI of 8.5 g/10 min was used. Poor storage capability was obtained. The results are shown in Tables 1 and 2.

Comparative Example 3

Example 1 was repeated except for using an EVOH having an ethylene content of 65 mole percent, a saponification degree of vinyl acetate component of 99.3 mole percent and an MI of 25 g/10 min was used. Poor storage capability was obtained. The results are shown in Tables 1 and 2.

Comparative Example 4

Example 1 was repeated except for using an EVOH having an ethylene content of 17 mole percent, a saponification degree of vinyl acetate component of 99.5 mole percent and an MI of 7.5 g/10 min and changing the thermoforming temperature for preparing the multilayered sheet from 190° C. to 210° C. Storage capability, thermoformability and talc dispersibility were all poor. The results are shown in Tables 1 and 2.

Comparative Example 5

Example 1 was repeated except for changing the blend ratio of EVOH and talc as shown in Table 1. Storage capability, thermoformability and talc dispersibility were all poor. Talc was found to have been aggregated in several parts. The results are shown in Tables 1 and 2.

Comparative Example 6

Attempts were made to repeat Example 1 except for changing the blend ratio of talc to EVOH as shown in Table 1. It was impossible to carry out blend pelletization of EVOH and talc because of difficulty in kneading due to poor fluidity. The results are shown in Tables 1 and 2.

Comparative Examples 7

Example 1 was repeated except for using EVOH containing sodium dihydrogenphosphate in amounts as shown in Table 2. The moisture permeability was large so that storage capability was poor. The results are shown in Tables 1 and 2.

Example 6

In a mixed solvent of 76 parts by weight of methanol and 4 parts by weight of methyl acetate, was dissolved 27.9 parts by weight (corresponding to 16 parts by weight after saponification (W2)) of an ethylene-vinyl) acetate copolymer (hereinafter referred to as EVAc) having an ethylene content of 31 mole percent and 6.45 parts by weight (corresponding to 4 parts by weight after saponification (W1)) of another EVAc having an ethylene content of 48 mole percent. To the solution was added dropwise a sodium hydroxide/methanol solution (mole ratio to vinyl acetate moiety=0.2) under reflux at 80° C., while a mixed methanol/methyl acetate vapor was blown into the reaction mixture to remove byproducts. The obtained EVOH composition was immersed in an aqueous sodium dihydrogenphosphate solution, to give an EVOH composition having an ethylene content of 34 mole percent, an average saponification degree of 99.5 mole percent and an MI of 2.9 g/10 min and containing sodium dihydrogenphosphate in an amount as converted into phosphate ion of 45 ppm.

Example 1 was repeated except that the thus obtained EVOH was used and that the thermoforming temperature of the multilayered sheet was 150° C. The thermoformability, storage capability and talc dispersibility were all good and the container after retorting exhibited no change in appearance. The results are shown in Tables 3 and 4.

Examples 7 and 8 and Comparative Examples 8 and 9

Example 6 was repeated except for using starting materials and conditions as shown in Table 3 and 4. The results are shown in Tables 3 and 4.

Obviously, numerous modifications and variations of the present invention are possible in light of the above teachings. It is therefore to be understood that within the scope of the appended claims, the invention may be practiced otherwise than as specifically described herein.

TABLE 1

| | EVOH (E) | | | | Talc (T) [*1] | | | |
|---|---|---|---|---|---|---|---|---|
| | Ethylene content (mole %) | Saponification degree (mole %) | MI (g/10 min) | Tm (°C.) melting point | Weight average flake diameter (μm) | Weight average aspect ratio | E/T (Weight ratio) | Moisture permeability, W [*3] |
| Example 1 | 31 | 99.5 | 1.6 | 183 | 10 | 15 | 80/20 | 35 (64) |
| Example 2 | 31 | 99.5 | 1.6 | 183 | 10 | 15 | 70/30 | 29 (64) |
| Example 3 | 31 | 99.5 | 1.6 | 183 | 10 | 15 | 60/40 | 26 (64) |
| Example 4[*] | 31 | 99.5 | 1.6 | 183 | 10 | 15 | 80/20 | 34 (64) |
| Example 5 | 31 | 99.5 | 1.6 | 183 | 5 | 10 | 80/20 | 38 (64) |
| Comp. Ex. 1 | 31 | 99.5 | 1.6 | 183 | — | 15 | 100/0 | 69 (64) |
| Comp. Ex. 2 | 31 | 90.0 | 8.5 | 158 | 10 | 15 | 80/20 | 155 (64) |
| Comp. Ex. 3 | 65 | 99.3 | 25 | 124 | 10 | 15 | 80/20 | 11 |
| Comp. Ex. 4 | 17 | 99.5 | 7.5[*6] | 207 | 10 | 15 | 80/20 | 250 |
| Comp. Ex. 5 | 31 | 99.5 | 1.6 | 183 | 10 | 15 | 45/55 | — |
| Comp. Ex. 6 | 31 | 99.5 | 1.6 | 183 | 10 | 15 | 25/75 | — |
| Comp. Ex. 7 | 31 | 99.5 | 1.6 | 183 | 10 | 15 | 80/20 | 66 (64) |

*1 Characteristics of raw material talc before kneading.
*2 EVOH of Example 4 comprises 0.027 mole percent of vinyltrimethoxysilane as a copolymerizing component.
*3 Unit: g · 30 μm/m² · day. Values in the parentheses were calculated according to equation (I) ($\Sigma_{i=0}^{5} A_i \cdot E^1$)
*6 Measured at 210° C., load = 2160 g.

TABLE 2

| | Phosphate radical (ppm) | Thermoforming temp. (°C.) | Thermoformability [*4] | Container appearance (after retorting) [*5] | Storage capability | | Dispersion of talc |
|---|---|---|---|---|---|---|---|
| | | | | | Retorting condition | Taste, color and smell after 3 months' storage as compared with bottled food Number/10 Panelists | |
| Example 1 | 45 | 190 | ○ | ○ | 120° C., 30 min | No difference (10/10) | ○ |
| Example 2 | 40 | 190 | ○ | ○ | 120° C., 30 min | No difference (10/10) | ○ |
| Example 3 | 35 | 190 | ○ | ○ | 120° C., 30 min | No difference (10/10) | ○ |
| Example 4 | 45 | 190 | ○ | ○ | 120° C., 30 min | No difference (10/10) | ○ |
| Example 5 | 45 | 190 | ○ | ○ | 98° C., 30 min | No difference (10/10) | ○ |
| Comp. Ex. 1 | 55 | 190 | ○ | X | 120° C., 30 min | Changed, bad smell (7/10) | — |
| Comp. Ex. 2 | 45 | 190 | Δ | Δ | 120° C., 30 min | Changed, bad smell (8/10) | ○ |
| Comp. Ex. 3 | 45 | 190 | ○ | ○ | 120° C., 30 min | Changed, bad smell (8/10) | ○ |
| Comp. Ex. 4 | 45 | 210 | X | Δ | 120° C., 30 min | Changed, bad smell (8/10) | Δ |
| Comp. Ex. 5 | 45 | 190 | X | Δ | 120° C., 30 min | Changed, bad smell (8/10) | X |
| Comp. Ex. 6 | 45 | (kneading difficult) | | | — | — | — |
| Comp. Ex. 7 | 2 | 190 | ○ | ○ | 120° C., 30 min | Changed, bad smell (5/10) | ○ |

*4 ○: No cracks and uneven stretching. Δ: A little cracks and unevenly stretched parts. X: Many cracks and unevenly stretched parts.
*5 ○: Good, no change. Δ: Orange-skin like pattern partly generated on body wall surface. X: Orange-skin like pattern generated on body wall surface to a considerable extent.

TABLE 3

| | EVOH (E) | | | | | | | Talc (T) [*1] | | E/T (ratio by weight) | Moisture permeability W [*2] |
|---|---|---|---|---|---|---|---|---|---|---|---|
| | Average Et. content (mole %) | Ave. S. D. (mole %) | MI (g/10 min) | T1 (°C.) | T2 (°C.) | T2-T1 (°C.) | W1 / W1+W2 | Weight ave. flake diameter (μ) | Weight ave. aspect ratio | | |
| Example 6 | 34 | 99.5 | 2.9 | 158 | 183 | 25 | 0.2 | 10 | 15 | 80/20 | 31 (47) |
| Example 7 | 34 | 99.5 | 2.9 | 158 | 183 | 25 | 0.2 | 10 | 15 | 70/30 | 24 (47) |
| Example 8 | 36 | 99.5 | 2.1 | 164 | 183 | 19 | 0.4 | 5 | 10 | 80/20 | 23 (40) |
| Comp. Ex. 8 | 34 | 99.5 | 2.9 | 158 | 183 | 25 | 0.2 | — | — | 100/0 | 59 (47) |

TABLE 3-continued

| | EVOH (E) | | | | | | | Talc (T) [*1] | | E/T (ratio by weight) | Moisture permeability W [*2] |
|---|---|---|---|---|---|---|---|---|---|---|---|
| | Average Et. content (mole %) | Ave. S. D. (mole %) | MI (g/10 min) | T1 (°C.) | T2 (°C.) | T2-T1 (°C.) | W1/W1 + W2 | Weight ave. flake diameter (μ) | Weight ave. aspect ratio | | |
| Comp. Ex. 9 | 34 | 99.5 | 2.9 | 158 | 183 | 25 | 0.2 | 10 | 15 | 97/3 | 54 (48) |

*1 Characteristics of talc as starting material before kneading.
*2 Unit: g · 30 μm/m² · day; values in parentheses were calculated according to the equation (I).
S. D.: degree of saponification
ET.: ethylene

TABLE 4

| | Phosphate radical (ppm) | Thermoforming temp. (°C.) | Thermoformability [*4] | Container appearance (after retorting) [*5] | Storage capability | | Dispersion of talc |
|---|---|---|---|---|---|---|---|
| | | | | | Retorting condition | Taste, color and smell after 3 months' storage as compared with bottled food Number/10 Panelists | |
| Example 6 | 45 | 150 | ◯ | ◯ | 120° C., 30 min | No difference (10/10) | ◯ |
| Example 7 | 45 | 150 | ◯ | ◯ | 120° C., 30 min | No difference (10/10) | ◯ |
| Example 8 | 45 | 150 | ◯ | ◯ | 98° C., 30 min | No difference (10/10) | ◯ |
| Comp. Ex. 8 | 55 | 150 | ◯ | X | 120° C., 30 min | Changed, bad smell (7/10) | — |
| Comp. Ex. 9 | 52 | 150 | ◯ | X | 120° C., 30 min | Changed, bad smell (7/10) | ◯ |

*3 ◯: No cracks and uneven stretching. Δ: A little cracks and uneven stretching. X: Many cracks and uneven stretching
*4 ◯: Good, no change. Δ: Orange-skin like pattern partly generated on body wall surface. X: Orange-skin like pattern generated on body wall surface to a considerable extent.

What is claimed is:

1. A multilayered container comprising an intermediate layer of a resin composition (A) which comprises 50-95% by weight of an EVOH having an ethylene content of 20-60 mole percent, into which 5-500 ppm of phosphate radical is incorporated and 50-5% by weight of an inorganic filler, and inner and outer layers of a moisture resistant thermoplastic resin (B), at least the body wall part of said container comprising multiplicity of regions in which substantially 2-dimensional thin layers of the inorganic filler extend parallel with the wall surface and laminated with each other, said inorganic filler present in said regions having a weight average flake diameter of about 1 to 50 μm and a weight average aspect ratio of flake of at least 3;

said layer of said resin composition (A) having a moisture permeability satisfying the following condition (I):

$$W \leq \sum_{i=0}^{5} (A_i \cdot E^i) \quad (I)$$

wherein W is a moisture permeability (g·30 μm/m²·day) at 40° C., 90% relative humidity, E is the ethylene content (mole percent) in the resin composition (A), $A_i$ (i=0 to 5) is a constant as shown below and $E^i$ means the i-th power of E $A_0 = 1.105 \times 10^3$ $A_1 = -8.150 \times 10$ $A_2 = 2.420 \times 10$ $A_3 = -3.535 \times 10^{-2}$ $A_4 = 2.350 \times 10^{-4}$ $A_5 = -7.091 \times 10^{-7}$ 2. A multilayered container according to claim 1, wherein said EVOH is an EVOH composition (C) which comprises at least two different types of EVOH's each having a different average ethylene content within the range of 20 to 60 mole percent and an average degree of saponification of at least 95 mole percent, shows at least two endothermic peaks by DSC analysis and satisfies the following conditions (II) and (III)

$$5 \leq T2 - T1 \quad (II)$$

wherein $130 \leq T1 < T2 \leq 205$ $$0.01 \leq W1/(W1 + W2) \leq 0.6 \quad (III)$$

wherein T2 and T1 represent, in DSC analysis (temperature elevation rate: 10° C./min) of said composition, an independent endothermic peak maximum temperature (°C.) of melting and an independent endothermic peak minimum temperature (°C.) of melting, respectively, and W1 and W2 represent the weight of an EVOH having the minimum ethylene content and that of EVOH having the minimum ethylene content, respectively.

3. A multilayered container according to claim 2, wherein said EVOH composition (C) is an EVOH composition (D) obtained by saponification of a composition which comprises at least two different types of ethylene-vinyl ester copolymers each having a different ethylene content.

4. A multilayered container according to claim 1, wherein said inorganic filler is selected from the group consisting of talc and clay.

5. A multilayered container according to claim 1, wherein said ethylene-vinyl alcohol copolymer has an ethylene content of 20-60 mole percent, a saponification degree of at least 95% and a vinyl silane content of 0.0001-0.5 mole percent.

6. A package obtained by filling the multilayered container of claims 1 with contents, sealing it and treating the resulting package with hot water or steam.

* * * * *